United States Patent
Aposhian et al.

(10) Patent No.: US 10,595,459 B2
(45) Date of Patent: Mar. 24, 2020

(54) ADAPTIVE CONTROL OF A MOWER

(71) Applicant: FireFly Automatix, Inc., North Salt Lake, UT (US)

(72) Inventors: Steven R. Aposhian, Farmington, UT (US); Eric E. Aston, Farmington, UT (US); William M. Decker, Salt Lake City, UT (US); Samuel H. Drake, Cottonwood Heights, UT (US)

(73) Assignee: FireFly Automatix, Inc., North Salt Lake, UT (US)

( * ) Notice: Subject to any disclaimer, the term of this patent is extended or adjusted under 35 U.S.C. 154(b) by 185 days.

(21) Appl. No.: 15/892,232

(22) Filed: Feb. 8, 2018

(65) Prior Publication Data

US 2019/0239427 A1     Aug. 8, 2019

(51) Int. Cl.
| | | |
|---|---|---|
| *A01D 34/00* | (2006.01) | |
| *A01D 34/66* | (2006.01) | |
| *A01D 34/74* | (2006.01) | |
| *G05D 1/02* | (2020.01) | |
| *A01D 34/76* | (2006.01) | |
| *A01D 101/00* | (2006.01) | |

(52) U.S. Cl.
CPC ......... *A01D 34/006* (2013.01); *A01D 34/66* (2013.01); *A01D 34/74* (2013.01); *A01D 34/76* (2013.01); *G05D 1/0223* (2013.01); *G05D 1/0274* (2013.01); *A01D 2101/00* (2013.01); *G05D 2201/0208* (2013.01)

(58) Field of Classification Search
CPC ...... A01D 34/006; A01D 34/66; A01D 34/78; A01D 69/02; A01D 34/74; A01D 34/76; B60K 7/0007; G05D 1/0223; G05D 1/0274
USPC ......... 56/10.2 A, 10.2 H, 10.2 R, 11.9, 16.7, 56/17.1
See application file for complete search history.

(56) References Cited

U.S. PATENT DOCUMENTS

| | | | | |
|---|---|---|---|---|
| 6,092,355 | A * | 7/2000 | Ishmael | H02J 7/0031 56/10.2 R |
| 6,892,517 | B2 * | 5/2005 | Adams | A01D 34/006 56/10.2 R |
| 7,594,377 | B1 * | 9/2009 | Jansen | A01D 34/006 56/10.2 H |
| 8,572,939 | B2 * | 11/2013 | Koike | B60K 7/0007 56/10.2 A |
| 8,666,550 | B2 * | 3/2014 | Anderson | A01D 34/008 700/253 |
| 9,226,444 | B2 * | 1/2016 | Schygge | A01D 69/02 |
| 10,130,037 | B2 * | 11/2018 | Conrad | A01D 34/006 |

* cited by examiner

*Primary Examiner* — Robert E Pezzuto
(74) *Attorney, Agent, or Firm* — Kirton McConkie; Brian Tucker

(57) ABSTRACT

A mower can be adaptively controlled to optimize efficiency based on loads experienced by motors that drive the cutting blades. If the load is below a threshold, the ground speed of the mower can be increased. The mower's performance can also be monitored to identify characteristics of an area being cut and then such characteristics can be used to further enhance the efficiency of the mower.

21 Claims, 6 Drawing Sheets

ADAPTIVE CONTROL OF A MOWER

CROSS-REFERENCE TO RELATED APPLICATIONS

The subject matter of this application can be used in conjunction with the Adjustable Mower Deck described in commonly owned U.S. patent application Ser. No. 15/795,065 ("the '065 application") which was filed on Oct. 26, 2017 and which is incorporated herein by reference.

BACKGROUND

Golf courses, sod farms, and other establishments with expansive grassy areas typically employ large commercial mowers to cut grass. A typical commercial mower may include multiple "mower decks" that house the cutting blades. Unlike a common residential mower, the mower deck of commercial mowers typically houses multiple (e.g., 2-4) cutting blades.

Mower decks are oftentimes pulled behind and driven by a tractor. In addition to being expensive, a tractor-based mower typically requires a human operator that simply sets the speed of the tractor at a desired rate and steers the tractor along the desired path. In such cases, it may difficult or impossible for the operator to cut grass at maximum efficiency. For example, the operator may commence mowing at a particular speed that seems ideal for a particular section in the area to be cut, but may be entirely unaware that the particular speed is not ideal for the other sections in the area. As a result, the operator may end up cutting the area at a speed that is either too fast or too slow relative to a speed that will maximize efficiency.

BRIEF SUMMARY

The present invention extends to a mower and methods for adaptively controlling a mower to optimize efficiency. Based on loads of motors used to drive the mower's cutting blades, the ground speed of the mower can be adjusted. The present invention also extends to methods for monitoring a mower's performance to identify characteristics of an area being cut and then using such characteristics to further enhance the efficiency of the mower.

In one embodiment, the present invention is implemented as a mower comprising: a power plant that causes the mower to travel with a ground speed; one or more mower decks housing one or more cutting blades, each mower deck including one or more motors for driving the one or more cutting blades, at least one of the one or more mower decks including a sensor for monitoring a load of at least one of the one or more motors; and a control module that receives the monitored load from each sensor and generates one or more control signals for causing the ground speed to be adjusted based on the monitored load such that the ground speed of the mower is adjusted based on the load required to drive the one or more cutting blades.

In another embodiment, the present invention is implemented as a method for controlling a mower that includes a power plant and one or more mower decks having one or more motors for driving one or more cutting blades. A control module of the mower receives a monitored load of at least one of the one or more motors of the one or more mower decks. The control module can then compare the monitored load to an optimal load parameter. When the monitored load differs from the optimal load parameter, the control module can generate one or more control signals to cause the power plant to adjust a ground speed of the mower.

In another embodiment, the present invention is implemented as a mower comprising: a power plant that causes the mower to travel with a ground speed; a plurality of mower decks, each mower deck housing one or more cutting blades and having one or more motors for driving the one or more cutting blades, each mower deck also including a sensor for each of the one or more motors, each sensor monitoring and reporting a load of the corresponding motor; and a control module configured to receive and process the loads reported by the sensors and to cause the ground speed of the mower to be adjusted based on the loads.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

In this specification and the claims, the term "mower" should be construed as equipment that can be propelled across the ground and that is capable of cutting grass. One of skill in the art would understand that there are many different types and configurations of mowers. Therefore, although the following description will employ an example where the mower is in the form of a tractor that supports a number of mower decks, it should be understood that any type of mower could be configured to implement embodiments of the present invention. The term "mower deck" should be construed as a component of a mower that houses one or more cutting blades. The term "power plant" should be construed as the components of a mower that cause the mower to travel with a ground speed. The power plant of a mower may therefore include an engine, transmission, motor(s), and/or other components.

Figure 1:
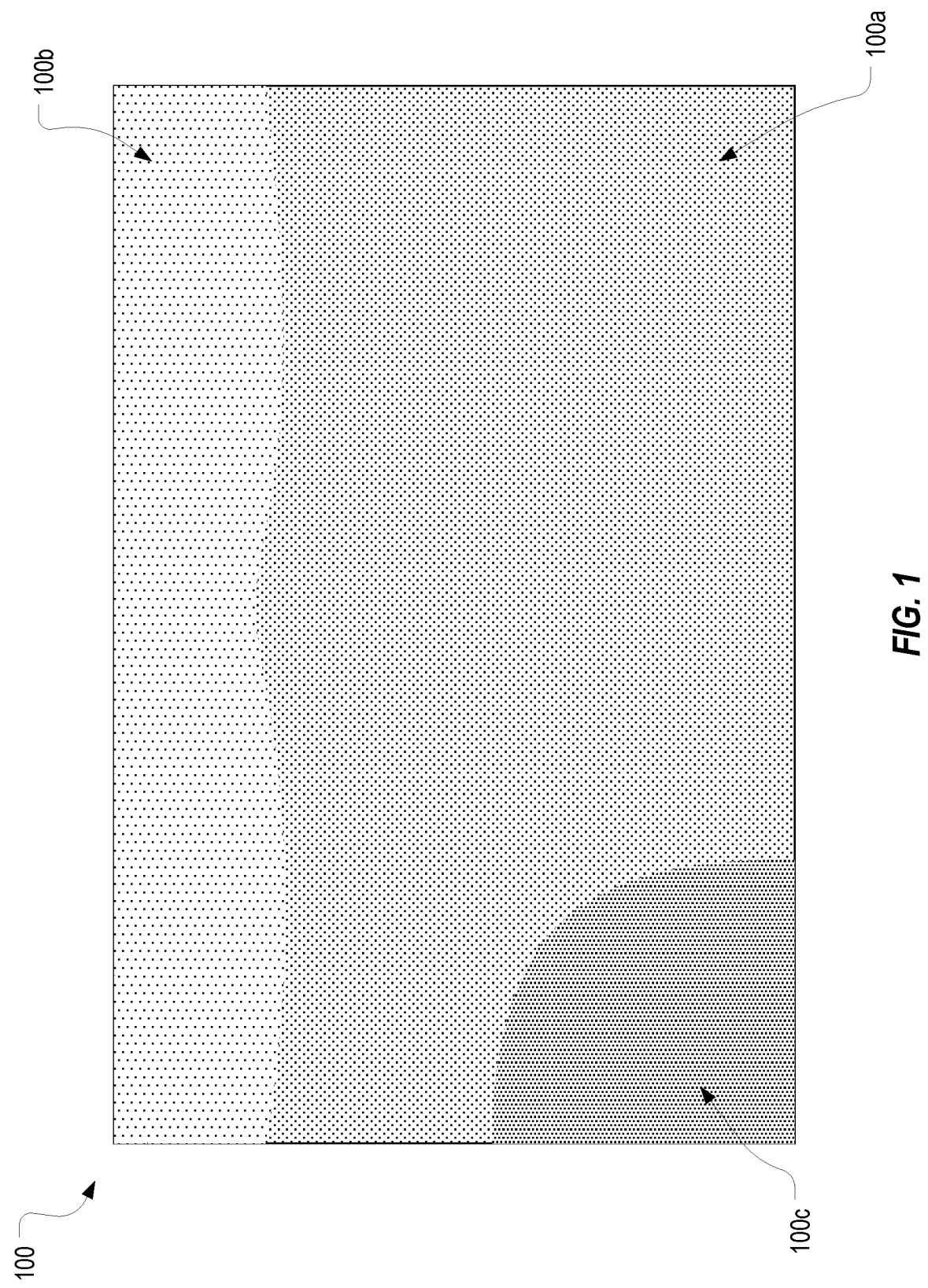
FIG. 1 illustrates an example of a grassy area that has sections with different densities.

FIG. 1 provides a representation of an area of grass 100 that has sections of different grass densities. In this context, the term density should be construed as the amount of grass that a cutting blade of a mower must cut through. The differences in the density could be caused by any of a number of reasons including thicker blades, a higher concentration of blades, etc., and these reasons should not be viewed as limiting to the invention. Area 100 includes a section of average density 100a, a section of lesser density 100b, and a section of increased density 100c. Of course, variations in density could occur in any pattern in a given grassy area.

As was mentioned in the background, with typical commercial mowers, the operator may commence mowing area 100 with the mower set to a particular speed that the operator deems appropriate. If the operator commenced mowing in the top right corner of area 100, the lower density in section 100b may cause the operator to select a speed that is relatively fast since the power plant will experience a lower load as the cutting blades cut through the less dense grass. Then, as the mower passes into the section of average density 100a, the speed at which the mower is travelling may cause the power plant to experience an excessive load. It is likely, however, that the operator will not notice the increase in load and therefore will not adjust the speed. As a result, the mower may operate less efficiently or possibly even be damaged. In contrast, if the operator commenced mowing in the bottom left corner of area 100, he or she may select a relatively slow speed based on the increased density in section 100c. In this scenario, the remainder of area 100 may be cut at a speed much less than optimal resulting in increased fuel and/or labor costs.

A mower configured in accordance with embodiments of the present invention can address these and other issues to enhance the efficiency of the mower and ensure optimal cutting of the grass while also collecting characteristics of the grass to further enhance subsequent mowings. The present invention may be applied to mowers that include a single mower deck or multiple mower decks and to mowers that are manually operated or self-driven. In many cases, a mower may include more than one mower deck each of which is configured to provide feedback that can be employed to adaptively control the operation of the mower.

Figure 2:
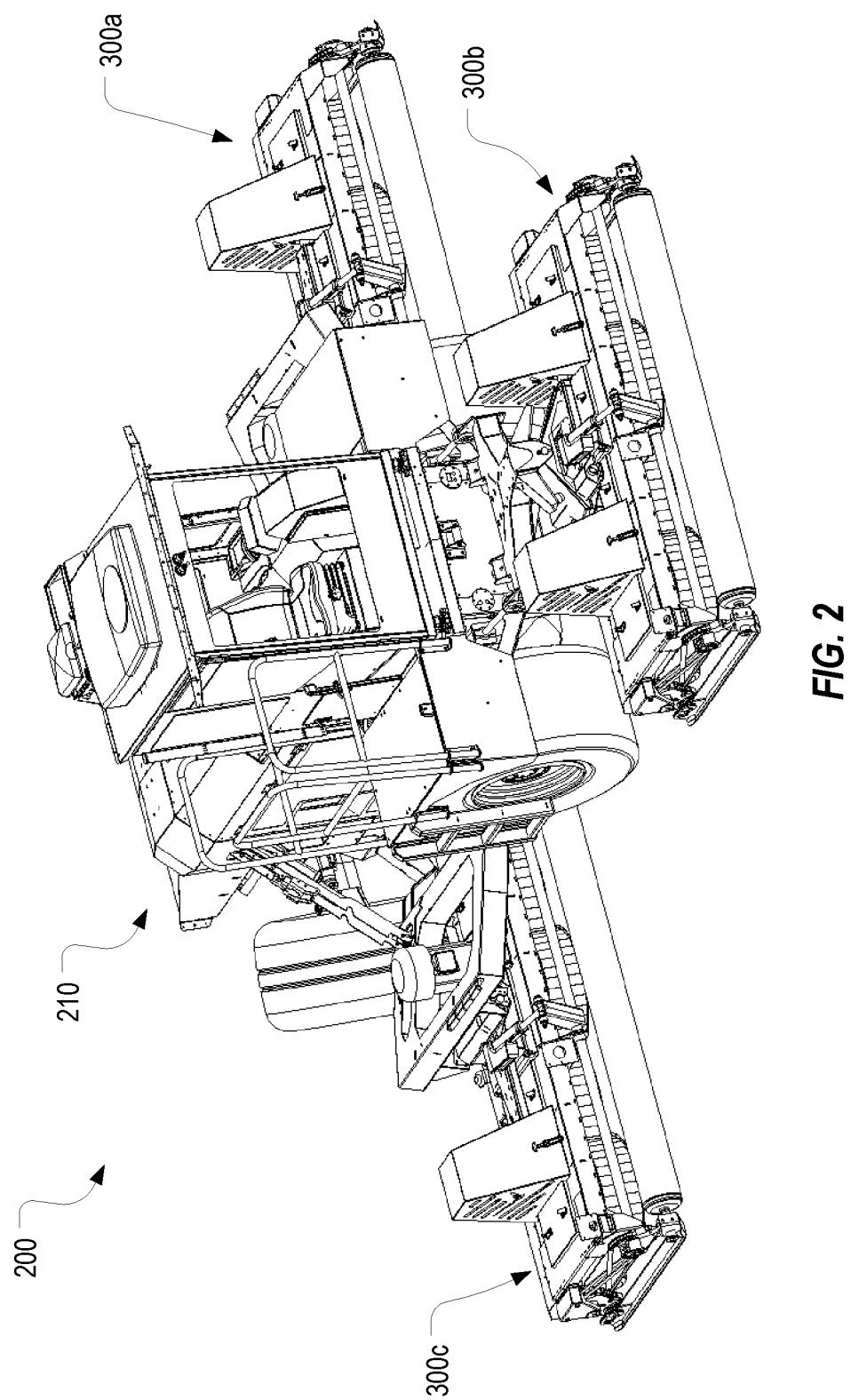
FIG. 2 illustrates an example of a mower that can be used to implement embodiments of the present invention.

FIG. 2 provides an example of a mower 200 that can be configured to implement embodiments of the present invention. As shown, mower 200 is configured as a tractor having a power plant 210 that provides power to each of multiple mower decks 300a-300c (or collectively 300) as well as to the drivetrain of the mower. In other words, power plant 210 provides power to propel mower 200 across the ground and to supply power to one or more motors on each mower deck 300 that rotate the cutting blades. Any drivetrain configuration could be used and the particular type of drivetrain is not essential to the invention. In some cases and in contrast to the depicted embodiment, the drivetrain could be coupled to wheels or rollers that form part of mower decks 300. Of importance to the present invention is that power plant 210 and/or the drivetrain can be controlled to alter the ground speed of mower 200.

Figure 3:
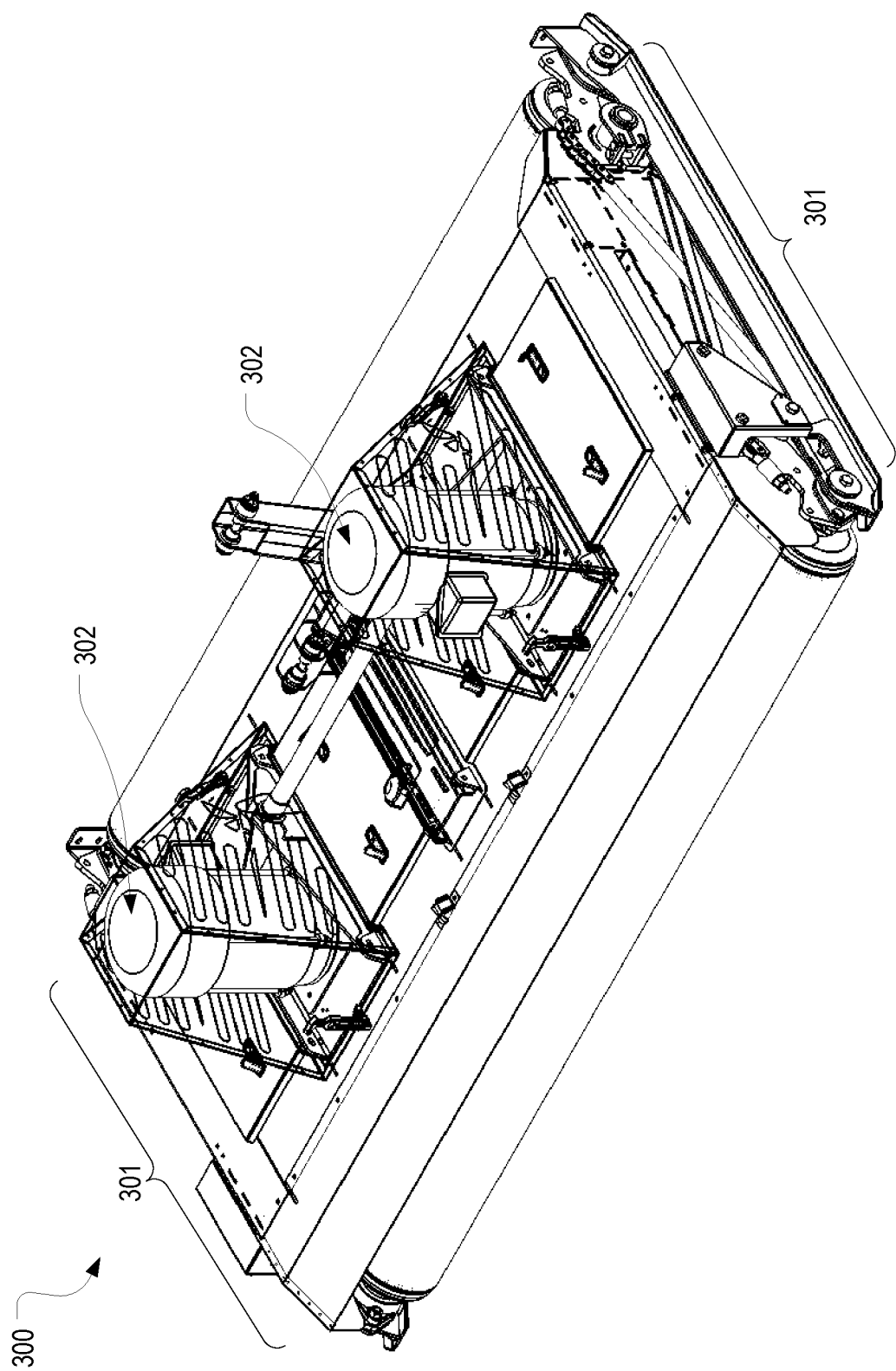
FIG. 3 illustrates a mower deck of the mower of FIG. 2.

FIG. 3 illustrates an isolated view of an example mower deck 300 that could be used on mower 200. Mower deck 300 houses a number of cutting blades, which is four in the depicted example, and includes two motors 302 for driving the cutting blades. In this example, each motor 302 independently drives two cutting blades. Of course, a mower deck could include a single motor or more than two motors that drive any reasonable number of cutting blades. Mower deck 300 also includes front and rear rollers that are coupled together via a linkage 301 that is described in detail in the '065 application. In some embodiments, the rollers can be replaced with four wheels. Linkage 301 allows the height of mower deck 300 relative to the ground to be adjusted uniformly with a single action as is also described in the '065 application.

Because each motor 302 drives two cutting blades (or, in other embodiments, at least one cutting blade), motor 302 will experience a load that varies based primarily on the density of the grass being cut. For example, if mower 200 were used to cut area 100, motors 302 would experience a greater load in section 100c than in sections 100a and 100b. While motors 302 are experiencing this greater load, they will also require more power from power plant 210 thereby increasing power plant 210's load. Accordingly, power plant 210's fuel consumption will be dependent on both the ground speed of mower 200 and the load of each of motors 302.

In accordance with embodiments of the present invention, mower 200 can be configured with a control system that adaptively alters one or more operational characteristics of mower 200 to enhance mower 200's efficiency. A block diagram representing this control system is provided in FIG. 4. As shown, mower 200 can include a control module 220 and each of mower decks 300a-300c can include a sensor 303 for monitoring a load on a corresponding motor 302. Control module 220 can represent any suitable type of circuitry including a processor, a microcontroller, an FPGA, an ASIC, a PLC, etc. Sensor 303 can represent any type of device or circuitry that is capable of monitoring the load of motor 302 and reporting the load to control module 220 as is represented by the arrows in FIG. 4.

Figure 4:
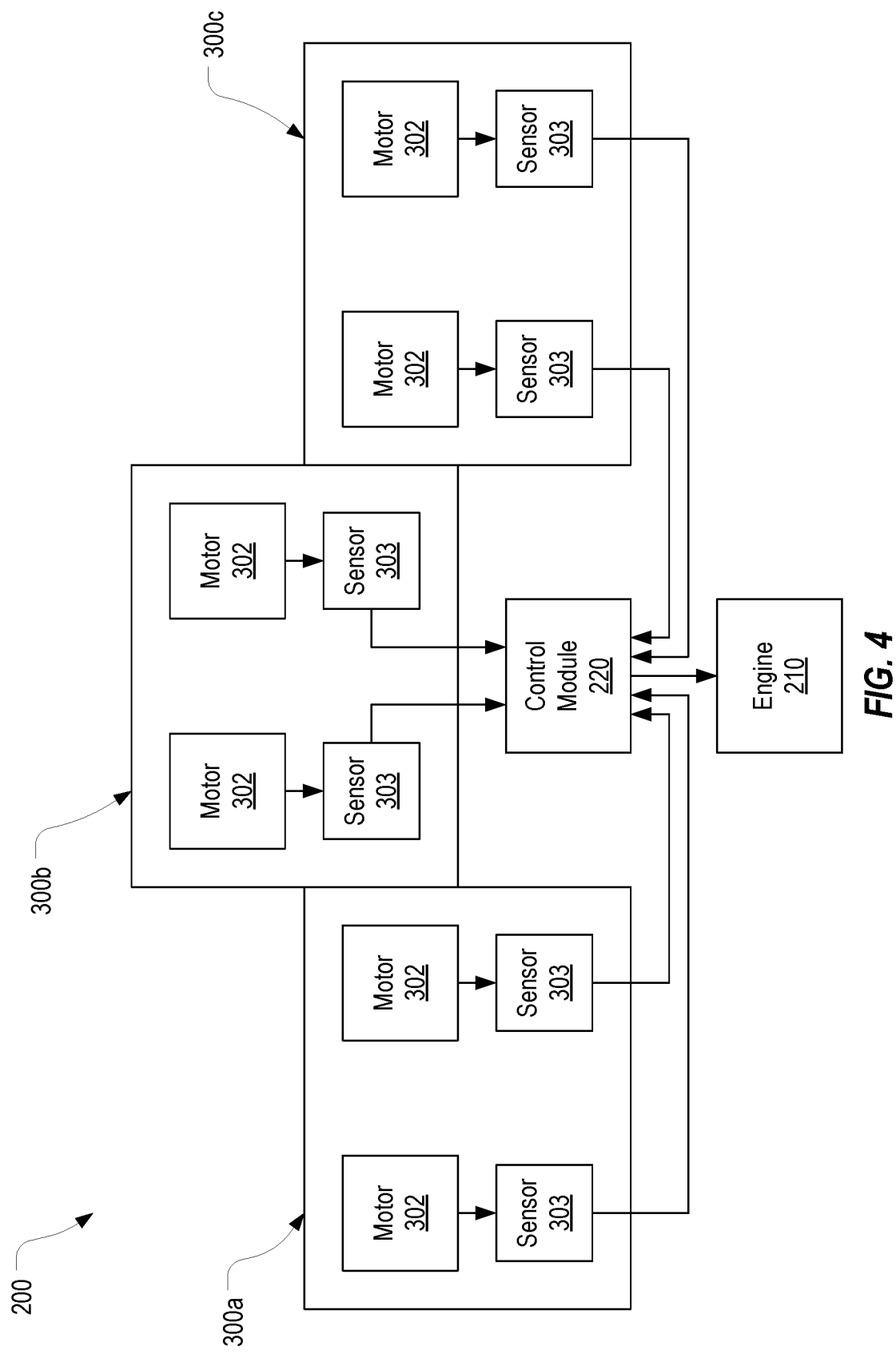
FIG. 4 provides a block diagram of a control system of a mower that can implement embodiments of the present invention.

Although FIG. 4 depicts an embodiment where a sensor 303 is dedicated to each motor 302 on each of mower decks 300, it is also possible to employ a sensor 303 on only one motor 302 per mower deck 300 or a single sensor 303 for the entire mower 200. In such cases, the load reported by the sensor 303 can be attributed to the other motor(s) 302 in the same mower deck 300 or to all other motors 302 in each of mower decks 300. In short, if a mower 200 includes n motors 302, it may include any number of sensors 303 between 1 and n for the purpose of monitoring the load on motors 302. However, having n sensors 303 for n motors 302 may be preferable because it allows the actual load on each of motors 302 to be monitored at all times.

Control module 220 can also be in communication with power plant 210 for the purpose of adjusting the ground speed of mower 200 based on the load reported by sensors 303. For purposes of this description and the claims, power plant 210 can represent any components that can cause the ground speed of mower 200 to be adjusted (e.g., the throttle, the transmission, etc.). It is oftentimes preferable to operate mower 200 at the highest ground speed that does not cause the performance of mower decks 300 to decline. For example, labor costs may typically exceed fuel costs such that it is more efficient to operate mower 200 at a high ground speed even if doing so reduces fuel efficiency. However, if the ground speed is too high, mower decks 300 may cut the grass poorly or may experience excessive wear. Accordingly, control module 220 can employ the load on motors 302 as reported by sensors 303 to determine whether the current ground speed of mower 200 is optimal and if not, generate control signals to cause power plant 210 to adjust the ground speed to an optimal level.

In some embodiments, control module 220 can be programmed with an optimal load parameter representing the load that motor 302 should experience when mower 200 is travelling at an optimal ground speed for the current density of the grass. This optimal load parameter may be a single value or a range of values applicable to all of motors 302

(i.e., the same value or range of values may apply to any of the motors' current loads) or a set that includes a single value or range of values for each motor 302 that is monitored by a sensor 303 (i.e., motor-specific values or ranges may be employed). As will be further described below, what may be optimal can vary based on an operator's desires, environmental conditions, or other factors.

As each of sensors 303 reports the current load of its corresponding motor 302, control module 220 can compare the reported loads to the optimal load parameter. If all of the current loads are below the optimal load parameter, control module 220 can determine that the ground speed of mower 200 can be increased and can therefore send control signals to cause power plant 210 to increase the ground speed by a specified amount. For example, control module 220 could adjust the throttle by some defined increment or a value that is dynamically calculated based on the difference between the optimal load parameter and the current loads. As the ground speed is increased, motors 302 should experience an increase in load (unless the increase in ground speed occurs in conjunction with a transition to less dense grass). Sensors 303 will detect and report this increased load to control module 220 which can again determine whether the ground speed of mower 200 should be adjusted. If the reported load is still below the optimal load parameter, control module 220 can again output control signals to increase the ground speed of mower 200. In contrast, if control module 220 determines that any of the reported loads exceeds the optimal load parameter, control module 220 can output control signals to cause the ground speed to be reduced. In this way, sensors 303 and control module 220 implement a closed-loop control system.

As mentioned above, this closed-loop control system could be implemented using a sensor 303 for each motor 302 on each mower deck 300 to thereby adjust the ground speed based on the actual load experienced by any of motors 302. This closed-loop control system could also be implemented using fewer sensors 303 than motors 302. Control module 220 may be configured to process the loads reported by sensors 303 in parallel or may sequentially process the loads. In either case, this processing can be performed continuously or at periodic intervals (e.g., every few seconds).

Figure 5:
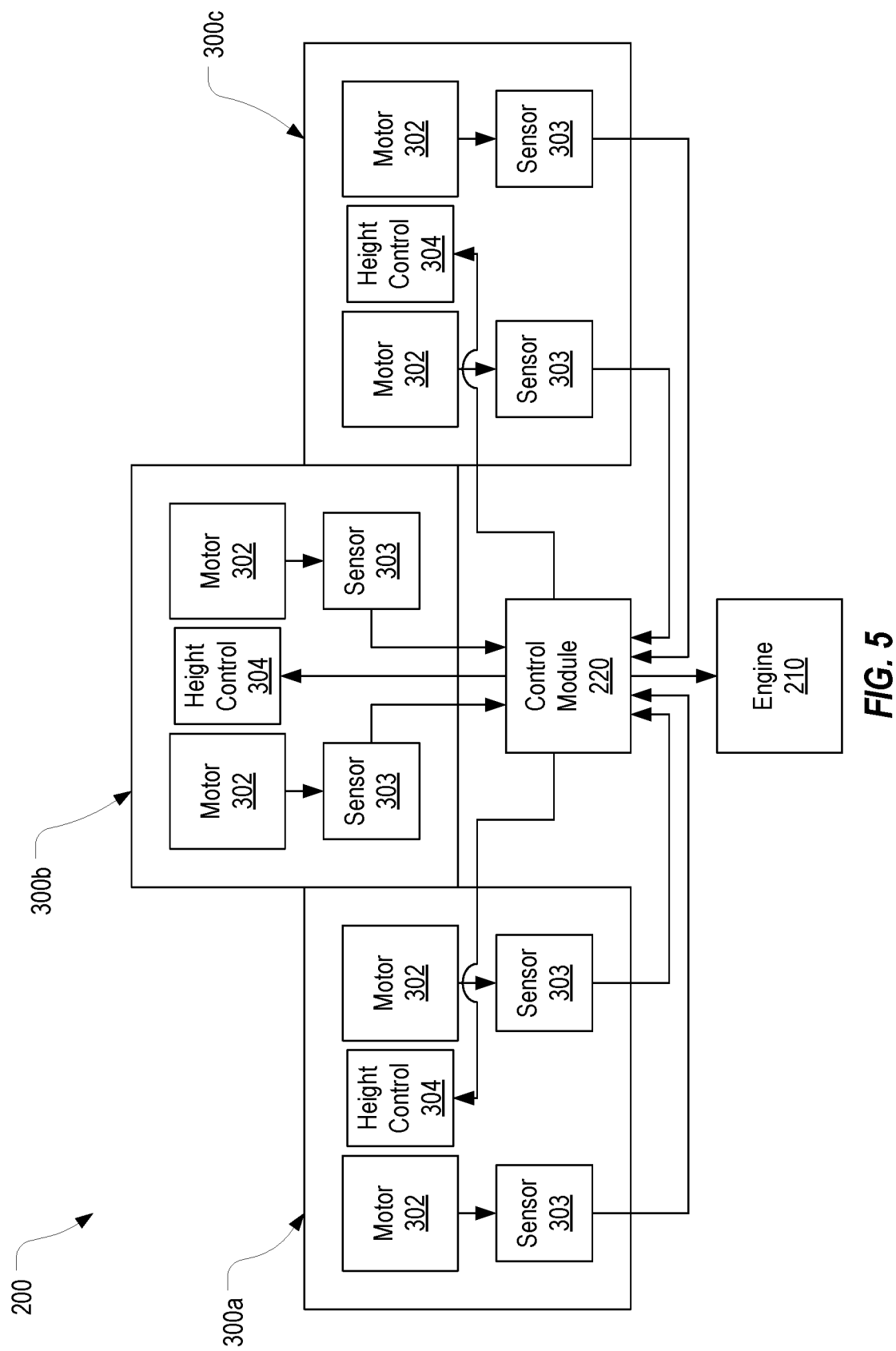
FIG. 5 provides another block diagram of a control system.
Figure 6:
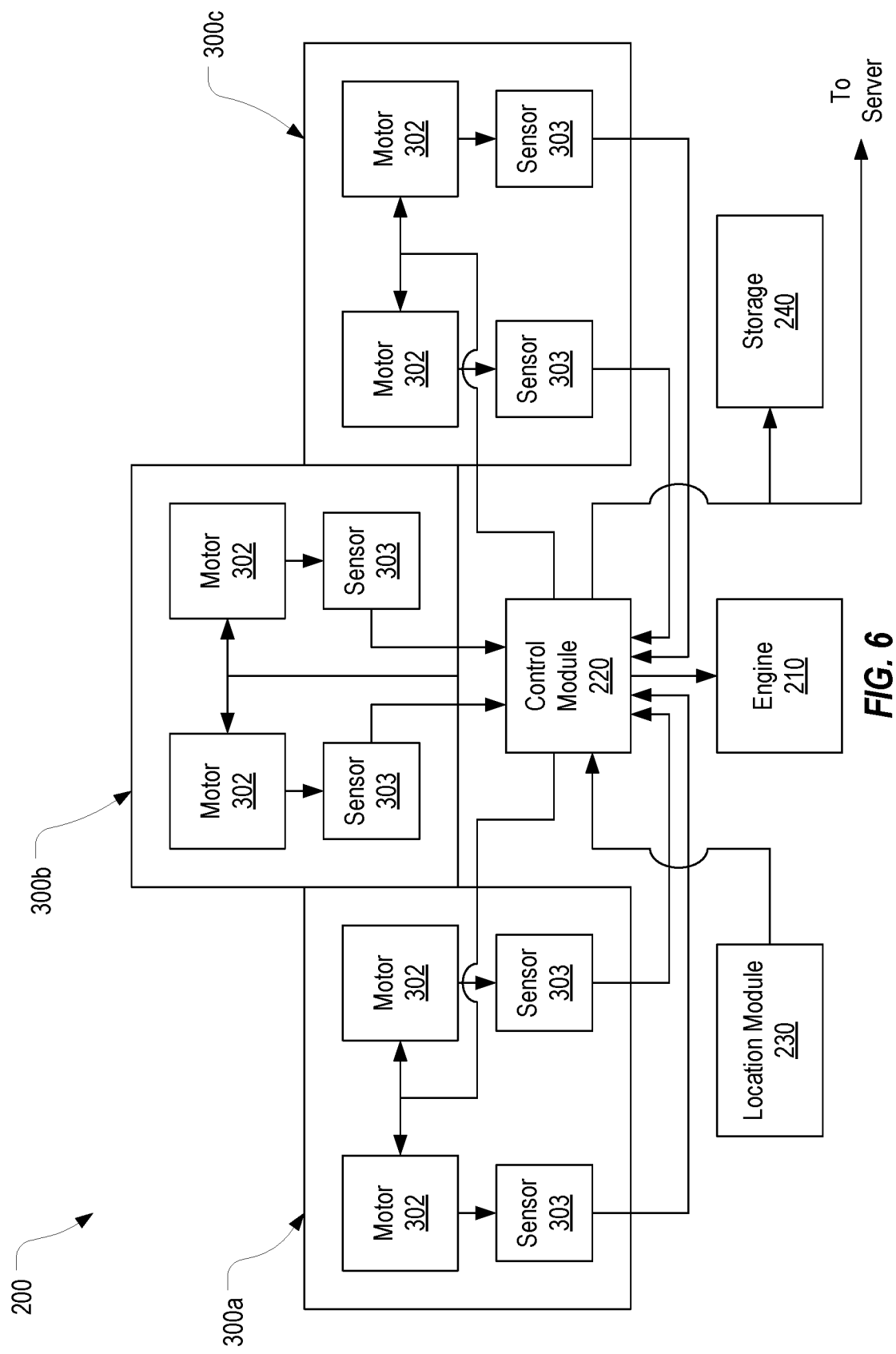
FIG. 6 provides another block diagram of a control system.

In some embodiments, in addition to or in place of adjusting the ground speed of mower 200, control module 220 may alter the height of the cutting blades based on the current load experienced by motors 302. For example, as shown in FIG. 5, each mower deck 300 can include a height control component 304 that is configured to adjust the height of the cutting blades relative to the ground. The '065 application discloses one suitable implementation of height control component 304. However, any component that is capable of adjusting the height of the cutting blades in response to control signals received from control module 220 could be used including components that are incorporated into mower 200 as opposed to mower decks 300.

As an example, mower 200 may pass into section 100c and experience a dramatic increase in the loads on motors 302. In conjunction with detecting the increased loads reported by sensors 303, control module 220 may also determine that the current ground speed of mower 200 is at or below a defined ground speed threshold (which may be programmed into or otherwise made accessible to control module 220 as either a single value or a range of values). In such cases, control module 220 may determine that it would be more efficient to raise the cutting height of mower decks 300 rather than (or possibly in addition to) further slowing the ground speed. As a result, control module 220 can output control signals to height control components 304 to cause them to automatically alter the cutting height of mower decks 300. Alternatively, control module 220 could output an indication to an operator that he or she should interface with height control components 304 to raise the cutting height. When the cutting height is raised to cut a particular section, mower 200 can be controlled to subsequently lower the cutting height and recut the section so that it is ultimately cut to the same height as the other sections of grass. Alternatively, control module 220 can provide feedback an operator instructing the operator to recut the section once the cutting height has been lowered.

In summary, control module 220 can store or otherwise have access to threshold parameters representing optimal operational characteristics of mower 200 and can evaluate current loads of motors 302 against these threshold parameters and adapt the ground speed and/or cutting height to attempt to match the current operational characteristics to the optimal operational characteristics. These threshold parameters could be static values or dynamically updated values based on environmental conditions (e.g., temperature, humidity, soil conductivity, etc.), operator input (e.g., input that identifies a desire to maximize fuel efficiency or throughput), or any other factor. For example, if the operator specifies a desire to operate mower 200 at the highest reasonable ground speed, the optimal load parameter may be set to a relatively high value even though doing so may cause power plant 210 to have poor fuel efficiency. In contrast, if the operator specifies a desire to operate mower 200 with good fuel efficiency, the optimal load parameter may be set to a value that will maximize power plant 210's fuel efficiency even though this may cause mower 200 to operate at a slower ground speed.

In some embodiments, mower 200 may also be configured with a location module 230 that provides location information (e.g., GPS coordinates) to control module 220. In such cases, control module 220 can track the location of mower 200 in conjunction with monitoring the loads on motors 302. For example, as control module 220 receives loads from sensors 303, it may also obtain GPS coordinates (or other location information) from location module 230 and store the loads and corresponding GPS coordinates in storage 240 and/or transmit the loads and corresponding GPS coordinates to a remote server. In some embodiments, control module 220 may also store or transmit the corresponding ground speed and/or cutting height information with the loads and GPS coordinates. Because the load on motors 302 is dependent on the density of the grass being cut, the association of the loads and the GPS coordinates can be used to map the density of the grass in an area that has been cut. By also associating the ground speed and the cutting height, a more accurate density mapping can be obtained. Although not shown, additional information can also be associated with the GPS coordinates including environmental conditions such as humidity and temperature. Also, in some embodiments, mower decks 300 may be configured with additional sensors to generate other values that can be associated with the GPS coordinates. For example, mower deck 300 could include an accelerometer of other position sensing device that can output position information indicative of the vertical movement (e.g., bouncing) of mower deck 300. By mapping such values to the GPS coordinates, sections that may be uneven can be identified thereby enabling an operator to smooth the uneven sections. In short, mower 200 may include a wide variety and number of sensors that provide feedback to control module 220, and control module 220 can concurrently obtain location information from location module 230 to allow the feedback to be associated with a particular location.

In some embodiments, control module 220 and/or a server could process the load values (and/or any other available feedback) and associated location information to generate a density for each particular location within an area that is cut to thereby create the density map. FIG. 1 can be viewed as a graphical representation of such a density map. For purposes of this description and the claims, the term "density map" can be viewed as associations between location information and loads (or values derived from the loads) that were experienced by one or more of motors 302 when mower 200 was cutting at a particular location defined by the location information. The term density map may also be viewed as including associations between the location information and other sensor feedback obtained at the particular location defined by the location information.

Once a density map has been generated, control module 220 can employ the density map during subsequent mowings of the same area. For example, if mower 200 were used to cut area 100, a density map could be generated from the associations generated by control module 220 while area 100 is cut. This density map could then be made accessible to control module 220 (e.g., by storing it in storage 240) during a subsequent mowing of area 100. In such cases, control module 220 may obtain current GPS coordinates from location module 230 as mower 200 traverses area 100 and use the current GPS coordinates to obtain the density of the section being cut from the stored density map. In this way, control module 220 can predict the density of the grass to be cut and can adjust the ground speed and/or cutting height in advance. In conjunction with these proactive adjustments, control module 220 can still make reactive adjustments based on the current loads experienced by motors 302 as described above.

Another benefit of generating a density map is that it can be used to define a path that mower 200 should traverse to minimize the number of adjustments that need to be made to the ground speed and/or the cutting height. For example, if the operator typically cuts area 100 by traversing an up and down path, control module 220 may instruct the operator to traverse a left and right path to minimize the number of adjustments that need to be made to maximize the efficiency of mower 200. In particular, using an up and down path would cause mower 200 to travel between sections 100a and 100b many times whereas using a left and right path would cause mower 200 to travel between sections 100a and 100b a single time. If mower 200 were configured as a self-driven mower, control module 200 could cause mower 200 to automatically travel along the optimal path.

A density map can also be used to identify sections of a grassy area that may be in need of care or sections that may be thriving. For example, a density map generated for area 100 can identify that section 100c is very healthy thereby encouraging an operator to investigate why the section is thriving. On the other hand, the same density map can identify that area 100b is relatively unhealthy thereby prompting the operator to address the cause of the problem. In short, by generating a density map (or by providing the associations that can be used to compile a density map), control module 220 allows a number of enhancements in the mowing process to be made.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A mower comprising:
   a power plant that causes the mower to travel with a ground speed over an area;
   at least one mower deck housing at least one cutting blade, the at least one mower deck including at least one motor for driving the at least one cutting blade, the at least one mower deck including at least one sensor for monitoring a load of the at least one motor as the mower travels over the area;
   a location module that generates location information as the mower travels over the area; and
   a control module that receives the monitored load from the at least one sensor and the location information from the location module as the mower travels over the area and creates a density map from the monitored load and the location information.

2. The mower of claim 1, wherein the at least one mower deck comprises multiple mower decks.

3. The mower of claim 1, wherein each of the at least one mower deck includes multiple motors for driving multiple cutting blades and multiple sensors for monitoring loads of the multiple motors.

4. The mower of claim 1, wherein the control module also generates at least one control signal for causing the ground speed to be adjusted based on the monitored load.

5. The mower of claim 4, wherein the control module generates the at least one control signal to increase the ground speed when the monitored load is less than an optimal load parameter.

6. The mower of claim 4, wherein the control module generates the at least one control signal to decrease the ground speed when the monitored load is greater than an optimal load parameter.

7. The mower of claim 3, wherein the control module also generates at least one control signal to decrease the ground speed when the monitored load received from any of the multiple sensors is greater than an optimal load parameter.

8. The mower of claim 1, wherein the control module generates at least one control signals for causing a cutting height of the at least one mower deck to be adjusted based on the monitored load.

9. The mower of claim 8, wherein the control module generates the at least one additional controls signal to adjust the cutting height of the at least one mower deck based also on the ground speed of the mower.

10. The mower of claim 1, wherein the control module generates at least one control signal to raise a cutting height of the at least one mower deck when the ground speed of the mower is below a threshold.

11. The mower of claim 10, wherein the control module is configured to one or both of:
    store the density map on the mower; or
    transmit the density map to an external computing system.

12. The mower of claim 1, wherein the control module also creates the density map from one or more of:
    the ground speed;
    a cutting height of the at least one mower deck;
    position information of the at least one mower deck; or
    environmental conditions.

13. The mower of claim 1, wherein the control module employs the density map to adjust the ground speed of the mower when the mower subsequently travels over the area.

14. The mower of claim 1, wherein the mower includes three mower decks, each mower deck including two motors for driving cutting blades of the mower deck.

15. A method for creating a density map for an area when a mower that includes at least one mower deck having at least one motors for driving at least one cutting blade travels over the area, the method comprising:
  receiving, at a control module of the mower, a monitored load of the at least one motor as the mower travels over the area;
  receiving, at the control module, location information as the mower travels over the area; and
  creating the density map by associating the monitored load with the location information.

16. The method of claim 15, further comprising:
  transmitting the density map to an external computing system.

17. The method of claim 15, further comprising:
  when the mower subsequently travels over the area, adjusting the ground speed of the mower based on the density map.

18. The method of claim 15, wherein the density map is also created by associating the location information with one or more of:
  a ground speed;
  a cutting height of the at least one mower deck;
  position information of the at least one mower deck; or
  environmental conditions.

19. The method of claim 15, further comprising:
  adjusting a cutting height of the at least one mower deck based on the monitored load.

20. A mower comprising:
  a power plant that causes the mower to travel with a ground speed over an area;
  a plurality of mower decks, each of the plurality of mower deck housing at least one cutting blade and having at least one motor for driving the at least one cutting blade, each mower deck also including at least one sensor for monitoring and reporting a load of the at least one motor as the mower travels over the area; and
  a control module configured to receive the load reported by the at least one sensor of the at least one mower deck and associate the load with location information to create a density map for the area.

21. The mower of claim 20, wherein the control module is further configured to employ the density map to adjust the ground speed of the mower when the mower subsequently travels over the area.

* * * * *